United States Patent [19]

Kok et al.

[11] Patent Number: 5,060,293

[45] Date of Patent: Oct. 22, 1991

[54] ANTENNA SWITCH FOR TRANSMIT-RECEIVE OPERATION USING RELAYS AND DIODES

[75] Inventors: Gee S. Kok; Sek L. Chan, both of Penang, Malaysia; Wan F. Tay, Coral Springs, Fla.; Pek B. Teo, Penang, Malaysia; Chacko Prakash, Penang, Malaysia; Hock S. Lim, Penang, Malaysia

[73] Assignee: Motorola, Inc., Schaumburg, Ill.

[21] Appl. No.: 424,412

[22] Filed: Oct. 20, 1989

[51] Int. Cl.$^5$ .......................... H01P 1/10; H04B 1/44
[52] U.S. Cl. ........................................ 455/78; 455/83; 333/101; 333/103; 333/105; 335/4
[58] Field of Search .................. 333/101, 103–105, 333/262; 335/4, 5; 455/78, 82, 83; 370/38

[56] References Cited

U.S. PATENT DOCUMENTS

| | | | |
|---|---|---|---|
| 2,697,207 | 12/1954 | Thompson | 333/105 |
| 3,562,597 | 2/1971 | White | 335/5 X |
| 3,800,222 | 3/1974 | Kowalewski | 455/83 |
| 3,946,390 | 3/1976 | Alexander et al. | 343/702 |
| 4,361,905 | 11/1982 | Etherington et al. | 370/38 X |
| 4,399,557 | 8/1983 | Muskiewicz | 455/82 |
| 4,637,065 | 1/1987 | Ruppel | 455/78 |
| 4,803,447 | 2/1989 | Schultz et al. | 333/103 |
| 4,885,799 | 12/1989 | Van Horn | 455/83 X |

FOREIGN PATENT DOCUMENTS

| | | | |
|---|---|---|---|
| 123101 | 7/1985 | Japan | 333/101 |
| 260233 | 12/1985 | Japan | 455/78 |
| 8802559 | 4/1988 | Japan | 333/101 |

*Primary Examiner*—Eugene R. Laroche
*Assistant Examiner*—Benny Lee
*Attorney, Agent, or Firm*—Robert S. Babayi

[57] ABSTRACT

A four port antenna switch (300) for switching a receive port (320) and a transmit port (310) between a remote antenna port (330) and a standard antenna port (340) is provided. The switching actions of the receive port (320) between the remote antenna port (330) and the standard antenna port (340) is provided by a relay (350) under the control of a relay controller (352, 354, 400). The switching of the transmit port (310) between the standard antenna port (340) and the remote antenna port (330) is provided by diode switches (360, 370) under the control of diode switch controllers (332, 324, 312, 314, 400). The switching actions of the relay (350) and the diode switches (370, and 360) is complementary to each other, wherein sufficient isolation between the receive port and the transmit port is provided. In this arrangement, a low power relay may be used because the relay only switches low level received signals, and the high power transmit signals are switched by the pins.

3 Claims, 2 Drawing Sheets

ANTENNA SWITCH FOR TRANSMIT-RECEIVE OPERATION USING RELAYS AND DIODES

TECHNICAL FIELD

This invention relates generally to the field of antenna switches in particular those antenna switches which provide a wide operational bandwidth.

BACKGROUND

In a simplex two-way radio communication, an antenna must be coupled to a receive port in order to allow reception of a signal by a receiver, and similarly it must couple to a transmit port in order to allow transmission of a signal. For example, in a two-way portable radio unit an antenna switch switches the antenna between the receive port and the transmit port in response to control signals generated by pressing a push-to-talk (PTT) button. Additionally, in some portable two-way radios, an additional antenna port is provided to allow reception and transmission of signals through a remote antenna. The remote antenna may be an antenna on a car, or an accessory unit. Accordingly, a four port antenna switch is needed to provide for switching of signals through a standard antenna port or a remote antenna port.

Conventionally, the antenna switch may comprise one or more relays for switching the selected antenna (remote or standard) between the receive port or the transmit port. In this arrangement, when the PTT button is pressed, the relay is energized and switching action occurs. Additionally, a mechanical switch may be used for switching the standard antenna and the remote antenna to a selected port (transmit or receive) when an accessory unit is connected to the radio. Occasionally, the relay must withstand a substantially high power radio frequency (RF) signal from the transmit port, when the radio is transmitting RF signals. In some two-way portable radios the high power RF signal may be as high as 10 watts, therefore, a miniature high power relay is used. The miniature high power relays are expensive and also pose a reliability problem because the contacts of these type of relays may be eroded quickly due to conditions caused by switching high power RF signals. Accordingly, using mechanical switching means, such as relays and mechanical switches, however, presents a problem of reliability and cost.

Solid state switches provide an attractive alternative to the foregoing arrangement. FIG. 1 illustrates a common PIN diode switching network for antenna A. In the transmit mode the transmitter voltage $V_{TX}$ is coupled to the supply voltage while the receive voltage $V_{RX}$ is coupled to ground through inductor LRX. The transmit voltage $V_{TX}$ forward biases diode $CR_{TX}$ through inductor LTX and, thereby, couples the transmit port Tx to antenna port N which is coupled to ground via a resistor R. This configuration is very broadband since the transmit path includes only a forward biased PIN diode $CR_{TX}$, while the diabled receive port $R_X$ isolation is provided by a reversed bias diode $CR_{Rx}$. However, note that the diode $CR_{RX}$ can only be reversed biased by the maximum available supply voltage less the diode's bias voltage drop. The major drawback is that whenever the peak RF swings at the antenna port N exceed the available supply voltage, the RF signal will cause the disabled diode $CR_{RX}$ to turn on allowing power into the path intended to be disabled, thereby eliminating transmitter to receiver isolation. In land mobile communications the maximum supply voltage is 12 volts or less, while transmit power can approach 150 watts and transmit voltage swings can exceed 100 volts ($>>$12 volts). Clearly, the limited power handling capability of this configuration makes it unacceptable for land-mobile applications.

An alternative configuration is illustrated in FIG. 2. In the transmit mode, both PIN diodes $CR_{TX}$ and $CR_{RX}$ are forward biased through an inductor LTX by supply voltage $V_{Tx}$ to a conducting state. A quarter wavelength transmission line is employed to provide sufficient isolation between receive port Rx and the transmit mode. However, the major limitation of this configuration is that it contains a resonant element (i.e. the quarter wave line) that severely limits the bandwidth of the network and may cause transmit power loss.

One of ordinary skill in the art may appreciate that the arrangement of FIG. 2 may be duplicated in order to switch a standard antenna port and remote antenna port to one of the selected transmit or receive ports. However, this approach provides additional drawbacks. Because, one of the diodes must be reversed biased in order to isolate the remote antenna port from standard antenna port. Therefore, due to non-linear characteristic of diode, a reverse biased PIN diode in presence of a high power RF signal produces undesired frequency harmonics which adversely affect the performance of the radio. Filtering these undesired harmonics further reduces the antenna switch bandwidth and cause transmitter power loss.

SUMMARY OF THE INVENTION

Accordingly, it is an object of the present invention to provide a reliable high power wideband antenna switch.

Briefly, according to the invention, The antenna switch includes a receive port and a transmit port, wherein a standard antenna port may be selectively switched between the receive port and the transmit port. The standard antenna port couples to the receive port through a relay switching means which is activated by a relay switch control means. Additionally, the standard antenna couples to the transmit port through a diode switching means which is activated by a diode switch control means. The switching actions of the relay switching means and the diode switching means occurs in a complementary fashion such that sufficient isolation between the receive port and the transmit port is provided.

DETAILED DESCRIPTION OF THE PREFERRED EMBODIMENT

Figure 1:
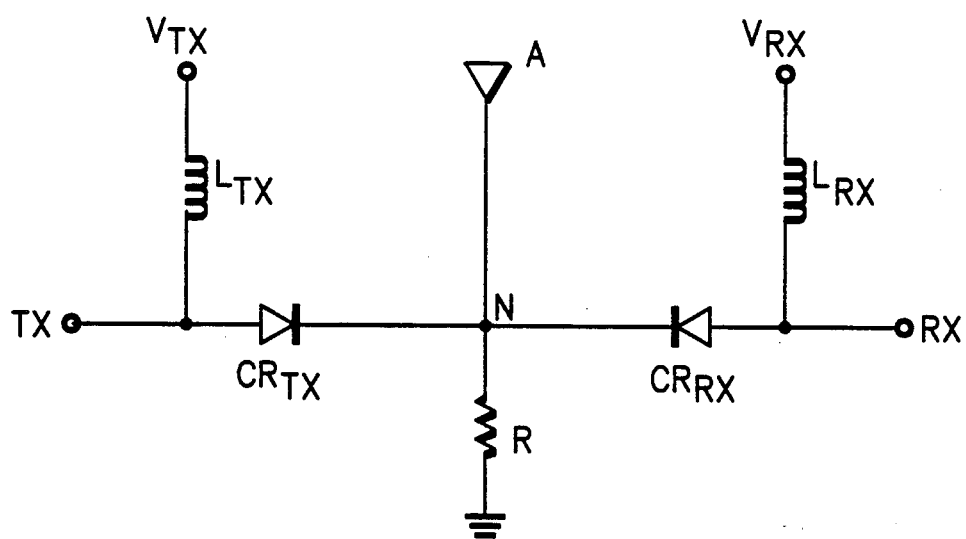
FIG. 1, illustrates a common PIN diode switching network found in the prior art.
Figure 2:
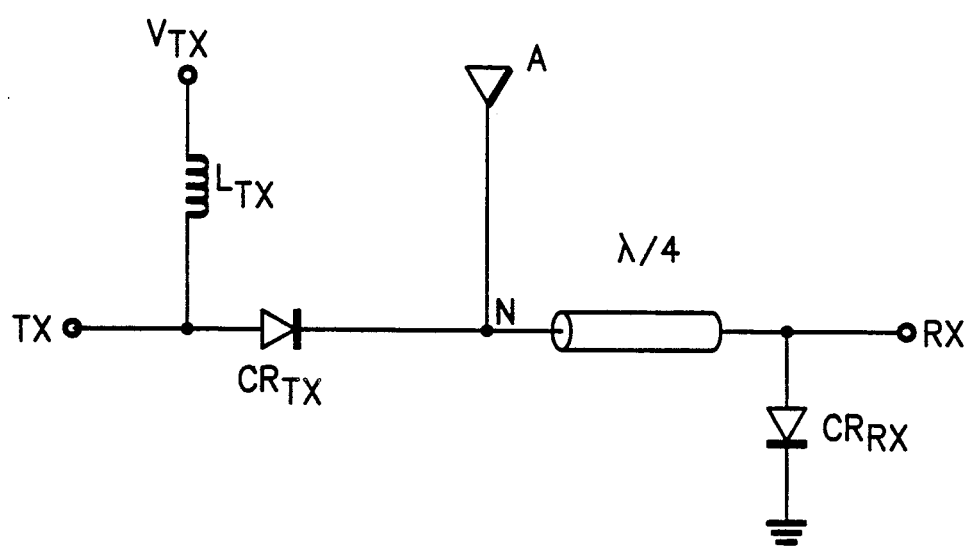
FIG. 2, illustrates another common PIN diode switching network also found in the prior art.
Figure 3:
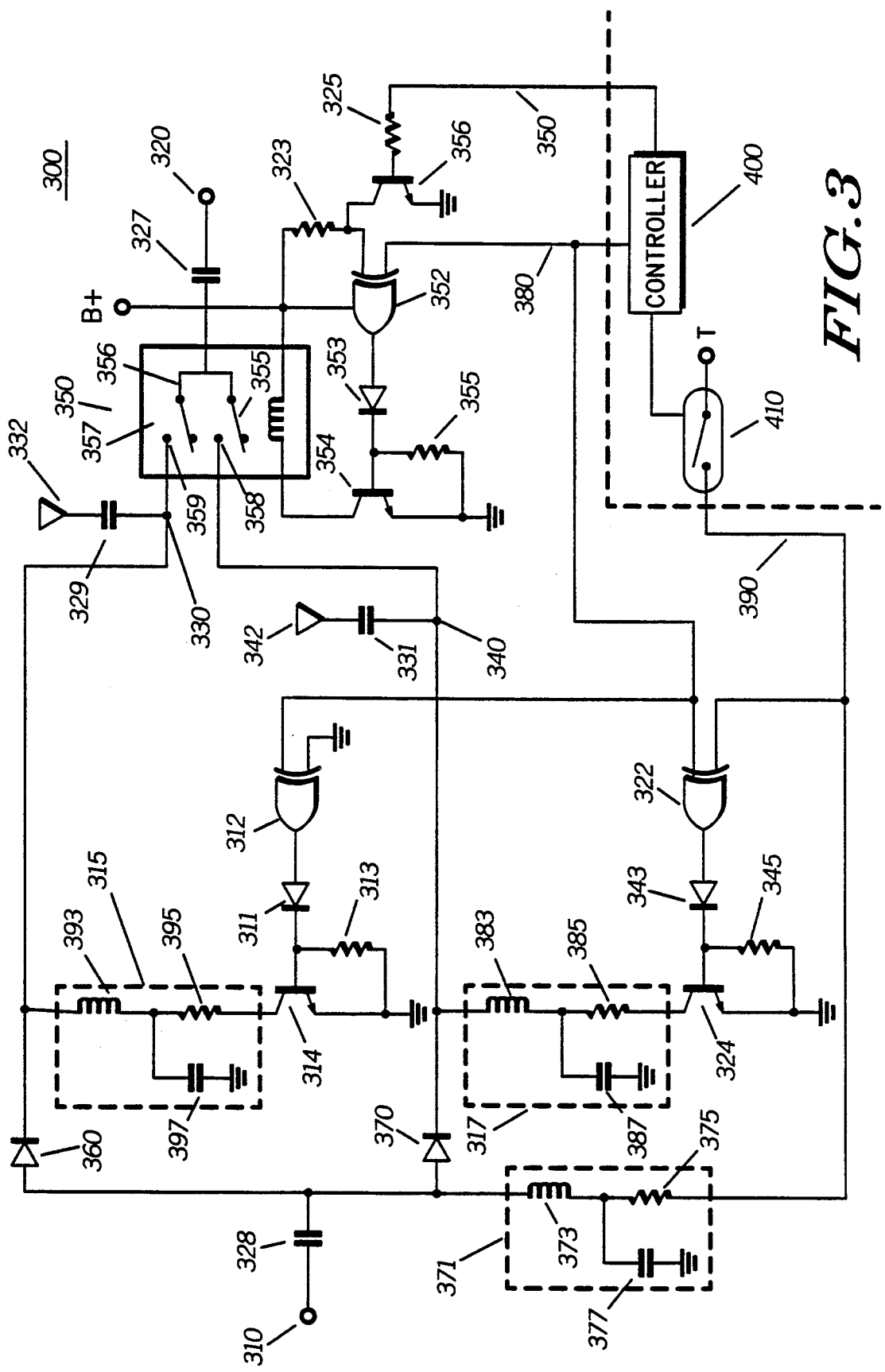
FIG. 3, is a schematic diagram of an antenna switch according to the present invention.

Referring to FIG. 3, a preferred embodiment of an antenna switch 300 of the invention is shown. The antenna switch 300 may be a part of a portable two-way radio (not shown). The antenna switch 300 is used to switch a received signal from a standard antenna 342 or a remote antenna 332 to a receive port 320, and to switch a transmitted signal from a transmit port 310 to the standard antenna 342 or the remote antenna 332. The receive port 320 is coupled to the standard antenna 342, through standard antenna port 340 and coupling capacitors 327 and 331. Similarly, the receive port 320 is coupled to the remote antenna 332 through a remote antenna port 330 and coupling capacitors 327 and 329. The receive port 320 is switched between the standard antenna port 340 and the remote antenna port 330 via a relay 350, which is activated in response to the state of a remote select signal 380 and a PTT signal 350. The remote select signal 380 and the PTT signal 350 are generated by a controller 400, which may also be controlling the operation of the radio. In the preferred embodiment of the invention, the relay 350 is a low power double pole single throw (DPST) relay. Common contacts 356 of first pole 355 and second pole 357 are coupled to the receive port 320. A normally closed contact (NC) 358 of the first pole 355 is coupled to the standard antenna port 340, and a normally open (NO) contact 359 is coupled to the remote port 330. The controller 400 sets the remote select signal 380 to a logic 1 for switching the receive port 320 to standard port 340, and it is set to a logic 0 for switching the receive port 320 to the remote antenna port 330. The PTT signal 350 is generated by the controller 400 and its state may depend on the position of the PTT button on the radio which is pressed when a radio transmission is required. The PTT signal is set to a logic 1 when the radio is in receive mode, and it is set to a logic 0 when the radio is in transmit mode.

In the receive mode, the state of the remote select signal 380 determines whether the remote port 340 or the standard port 330 may be selected. The PTT signal 350, which is set to a logic 1, is coupled to a transistor 356 via a resistor 325 and is inverted to provide a logic 0 at the input of a EXCLUSIVE NOR gate 352. The inverted PTT signal 350 also couples to the relay 350 through a resistor 323. When the remote select signal 380 is set to a logic 1, the output of the gate 352 which is coupled to a diode 353 and a resistor 355 turns off a transistor 354. The transistor 354 is coupled to the relay 350, and when turned off it de-energizes the relay 350. The relay 350, when de-energized, couples the standard antenna port 340 to the receive port 320 through the NC contact 358. Accordingly, the receive port 320 is coupled to the standard antenna port 340, when the relay is de-energized. This arrangement is desired, because it provides minimum current drain in the most frequent operational mode. When the remote select signal 380 is set to a logic 0, the relay 350 is energized pulling the switch toward its NO contact 359, thereby coupling the receive port 320 to the remote port 330. It should be noted that, due to mechanical arrangement of the relay 350, switching action from NC contact 358 to NO contact 359 and from NO 359 contact to NC 358 contact includes a certain delay before the switching actions of are completed. The significance of this delay in relation to the operation of the antenna switch 300 will be described later. In the receive mode, the isolation of the receive port 320 from the transmit port 310 is provided by PIN diodes 360 and 370 which remain turned off in this mode.

In the transmit mode, the transmit port 310 may be selectively coupled to the standard antenna port 340 or the remote antenna port 330 through capacitor 328 in response to the remote select signal 380 and a transmit signal 390. The transmit signal 390 is generated in the radio after the PTT button is pressed, and it provides a supply voltage for the radio transmitter. The transmit signal 390 is coupled to the antenna switch 300 through a switch 410. The switch 410 is controlled by the controller 400. The transmit signal 390 has sufficient level to provide a logic 1 at the input of a EXCLUSIVE NOR gate 322 and to turn on the PIN diodes through an RF network 371 when a sufficient current path is provided. The RF network 371 includes a resistor 375 coupled in series to an inductor 373 which provides DC coupling to the PIN diode 370. A capacitor 377 provides an RF short for the transmit signal 390. When the remote select line is set to a logic 1 the gate 322 turns on a transistor 324 via a diode 343 and a resistor 345 to and provide the current path for the PIN diode 370 through an RF network 317. The RF network 317 includes a resistor 385 coupled in series to an inductor 383 which provides AC coupling for the PIN diode 370. A capacitor 387 provides DC coupling for the PIN diode 370. Additionally, output of a EXCLUSIVE NOR gate 312 turns off a transistor 314 via a diode 311 and a resistin 313 which cuts off the current path for the PIN diode 360 through an RF network 315. The RF network 315 includes a resistor 395 coupled in series to an inductor 393 which provides AC coupling for the PIN diode 360. A capacitor 397 provides DC coupling for the PIN diode 360. Accordingly, the transmit port 310 is coupled to the standard antenna port 340, and it is isolated from the remote antenna port 330. One of ordinary skill in the art in light of the above description may appreciated that a logic 0 on the remote select signal 380 turns off the PIN diode 370, and turns on the diode 360. Therefore, the transmit port 310 is coupled to the remote antenna port 330, and it is isolated from the standard antenna port.

When the standard antenna port 340 is selected, the receive port 320 is isolated from the transmit port 310 by switching the first pole 355 to its NO contact. However, due to the delay associated with the switching actions of the relay 350, the transmit port 310 may be coupled to the standard antenna port 340 only after the first pole 355 is completely switched. Therefore, when the PTT switch is pressed the controller 400 sets the PTT signal to a logic 0, which causes the relay 350 to be energized and the switching action to occur. Then, after a predetermined delay, which in the preferred embodiment of the invention is approximately 5 ms, the controller couples the transmit signal 390 to the antenna switch 300 through the switch 410. Similarly, when the PTT switch is released, the controller 400 disconnects the transmit signal 390 from the antenna switch 300, and after a predetermined delay (in the preferred embodiment of the invention it is 3 ms) it sets the PTT signal 350 to a logic 0 to de-energizes the relay 350. Accordingly, the means for switching the receiver port 320, the relay 350, functions complementary to the means for switching the transmit port 310, the PIN diode 370. A person of ordinary skill in the art may appreciate that the in the arrangement of the antenna switch 300 no band limiting circuitry, such quarter wave resonators or transmission lines, are utilized. Therefore, a wideband antenna switch is provided, wherein power losses, due to the antenna switch, are minimized. Additionally, in this arrangement the relay 350 may be a low power, low cost relay. Because, the relay 350 is merely used for switching very low power received signals, and it is controlled such that a substantially high RF power is never present at its contacts.

It may be noted that in this arrangement, the receive port 320 is coupled to the remote antenna port 330, when the transmit port 310 is coupled to the standard antenna port 340. However, in the preferred embodiment of the invention, this condition is not significant to the operation of the radio, since this situation the radio is in transmit mode and can not receive any signals. A person of ordinary skill in the art may appreciate that, in lieu of cost considerations, a double pole relay having independent controls may be used in place of the relay 350 in order to place the receive port 320 in a detached position.

What is claimed is:

1. An antenna switch for selectively switching a receive port and a transmit port to at least one antenna port, comprising:
    a relay switching means coupled between said receive port and said antenna port for only switching a substantially low power received signal from said antenna port to said receive port;
    a diode switching means coupled between said transmit port and said antenna port for only switching a substantially high power transmit signal from said antenna port to said transmit port;
    a relay switch control means for switching said relay switching means to couple said receive port to said antenna port only when said transmit port is not coupled to said antenna port; and
    a diode switch control means for switching said diode switching means to couple said transmit port to said antenna port only when said receive port is not coupled to said antenna port.

2. The antenna switch of claim 1, wherein said antenna switch includes a remote antenna port; wherein said relay switching means selectively couples said receive port to said remote antenna port under the control of said relay switch control means, and wherein said diode switching means selectively couples said transmit port to said remote antenna port under the control of said diode switch control means.

3. The antenna switch of claim 1, wherein said diode switching means comprise a single PIN diode coupled between said transmit port and said antenna port.

* * * * *